(12) United States Patent
Isobe et al.

(10) Patent No.: US 12,476,511 B2
(45) Date of Patent: Nov. 18, 2025

(54) MOTOR-DRIVEN COMPRESSOR

(71) Applicant: KABUSHIKI KAISHA TOYOTA JIDOSHOKKI, Aichi-ken (JP)

(72) Inventors: Keisuke Isobe, Kariya (JP); Taku Adaniya, Kariya (JP); Shuji Takimoto, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 202 days.

(21) Appl. No.: 18/390,352

(22) Filed: Dec. 20, 2023

(65) Prior Publication Data
US 2024/0213843 A1    Jun. 27, 2024

(30) Foreign Application Priority Data
Dec. 27, 2022  (JP) .................. 2022-209613

(51) Int. Cl.
*H02K 3/34* (2006.01)
*H02K 1/16* (2006.01)
*H02K 3/28* (2006.01)
*H02K 3/32* (2006.01)
*H02K 3/38* (2006.01)

(52) U.S. Cl.
CPC .............. *H02K 3/345* (2013.01); *H02K 1/16* (2013.01); *H02K 3/28* (2013.01); *H02K 3/325* (2013.01); *H02K 3/38* (2013.01); *H02K 2203/12* (2013.01)

(58) Field of Classification Search
CPC ............... H02K 3/32–325; H02K 3/38; H02K 2203/09; H02K 2203/12
USPC ..................... 310/216.114–216.115
See application file for complete search history.

(56) References Cited

U.S. PATENT DOCUMENTS

2018/0183290 A1*  6/2018  Wüst ............... H02K 3/522
2023/0208242 A1*  6/2023  Suzuki ............. H02K 3/522
                                                       310/216.105

FOREIGN PATENT DOCUMENTS

JP    2009-191761 A      8/2009
JP    2014128049 A   *  7/2014
JP    2016-109045 A      6/2016

OTHER PUBLICATIONS

JP-2014128049-A Machine translation (Year: 2014).*

* cited by examiner

*Primary Examiner* — Oluseye Iwarere
*Assistant Examiner* — Minki Chang
(74) *Attorney, Agent, or Firm* — Greenblum & Bernstein, P.L.C.

(57) ABSTRACT

Projections are provided on bottom surfaces of U-phase through-grooves. This configuration ensures a sufficient engagement amount of each projection with a corresponding insertion portion as compared to a case in which the projections are provided on the end of an insulator on the side opposite to a stator core. As a result, each projection is stably engaged with the corresponding insertion portion. This allows the cover to be stably attached to the insulator.

4 Claims, 7 Drawing Sheets

MOTOR-DRIVEN COMPRESSOR

BACKGROUND

1. Field

The present disclosure relates to a motor-driven compressor.

2. Description of Related Art

A motor-driven compressor includes a compression unit, a motor, and a housing. The compression unit compresses a fluid. The motor drives the compression unit. The housing is tubular. The housing accommodates the motor. The motor includes a stator. The stator includes a tubular stator core, a tubular insulator, and windings forming coils. The stator core is fixed to the housing. The insulator is in contact with an end face of the stator core. The windings are wound on the stator core using a concentrated winding configuration. The windings each include connecting wires that connect the coils in the circumferential direction of the stator core.

Japanese Laid-Open Patent Publication No. 2016-109045 discloses an example of an insulator that includes guide grooves and through-grooves. The guide grooves are formed in the outer circumferential surface of the insulator. The guide grooves extend in the circumferential direction of the insulator. The guide grooves guide the connecting wires in the circumferential direction of the insulator. The through-grooves extend through the insulator in the radial direction. Each through-groove opens in an end face of the insulator that is opposite to the stator core such that the through-groove has two side surfaces facing each other in the circumferential direction of the insulator and a bottom surface that connects the two side surfaces to each other. The through-grooves guide the connecting wires routed out from the coils to the guide grooves.

The above-described motor-driven compressor may include a tubular cover to ensure insulation between the connecting wires and the housing. The cover surrounds the outer circumferential surface of the insulator to be located between the connecting wires and the housing. The insulator includes engaging portions. The cover includes receiving portions to which the engaging portions are engaged. The cover is attached to the insulator by engaging the engagement portions with the receiving portions.

When tension of the connecting wires is applied to the insulator, the insulator is deformed such that the insulator is bent inward in the radial direction about the end of the insulator closer to the stator core. Thus, the displacement amount of the insulator toward the radially inner side is the largest at the end of the insulator on the side opposite to the stator core. At this time, if the engaging portions are arranged, for example, at the end of the insulator on the side opposite to the stator core, it is difficult to ensure a sufficient engagement amount of the engaging portions with the receiving portions of the cover. This may hinder the engagement of the engaging portions with the receiving portions, resulting in unstable attachment of the cover to the insulator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a motor-driven compressor includes a compression unit that compresses a fluid, a motor that drives the compression unit, and a tubular housing that accommodates the motor. The motor includes a stator. The stator includes a tubular stator core fixed to the housing, a tubular insulator that is in contact with an end face of the stator core, and windings that are wound on the stator core using a concentrated winding configuration to form coils. The windings include connecting wires that connect the coils in a circumferential direction of the stator core. The insulator includes guide grooves and through-grooves. The guide grooves are formed in an outer circumferential surface of the insulator and extend in a circumferential direction of the insulator to guide the connecting wires in the circumferential direction of the insulator. The through-grooves extend through the insulator in a radial direction and open in an end face of the insulator on a side opposite to the stator core such that each of the through-grooves has two side surfaces that face each other in the circumferential direction of the insulator and a bottom surface that connects the side surfaces to each other. The through-grooves guide the connecting wires routed out from the coils to the guide grooves. The motor-driven compressor includes an insulating tubular cover that surrounds the outer circumferential surface of the insulator to be located between the connecting wires and the housing. The insulator includes engaging portions. The cover includes receiving portions with which the engaging portions are engaged. The cover is attached to the insulator by engaging the engaging portions with the receiving portions. The engaging portions are respectively provided on the bottom surfaces.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A motor-driven compressor 10 according to one embodiment will now be described with reference to FIGS. 1 to 8. The motor-driven compressor 10 of the present embodiment is used, for example, in a vehicle air conditioner.

Basic Configuration of Motor-Driven Compressor

Figure 1:
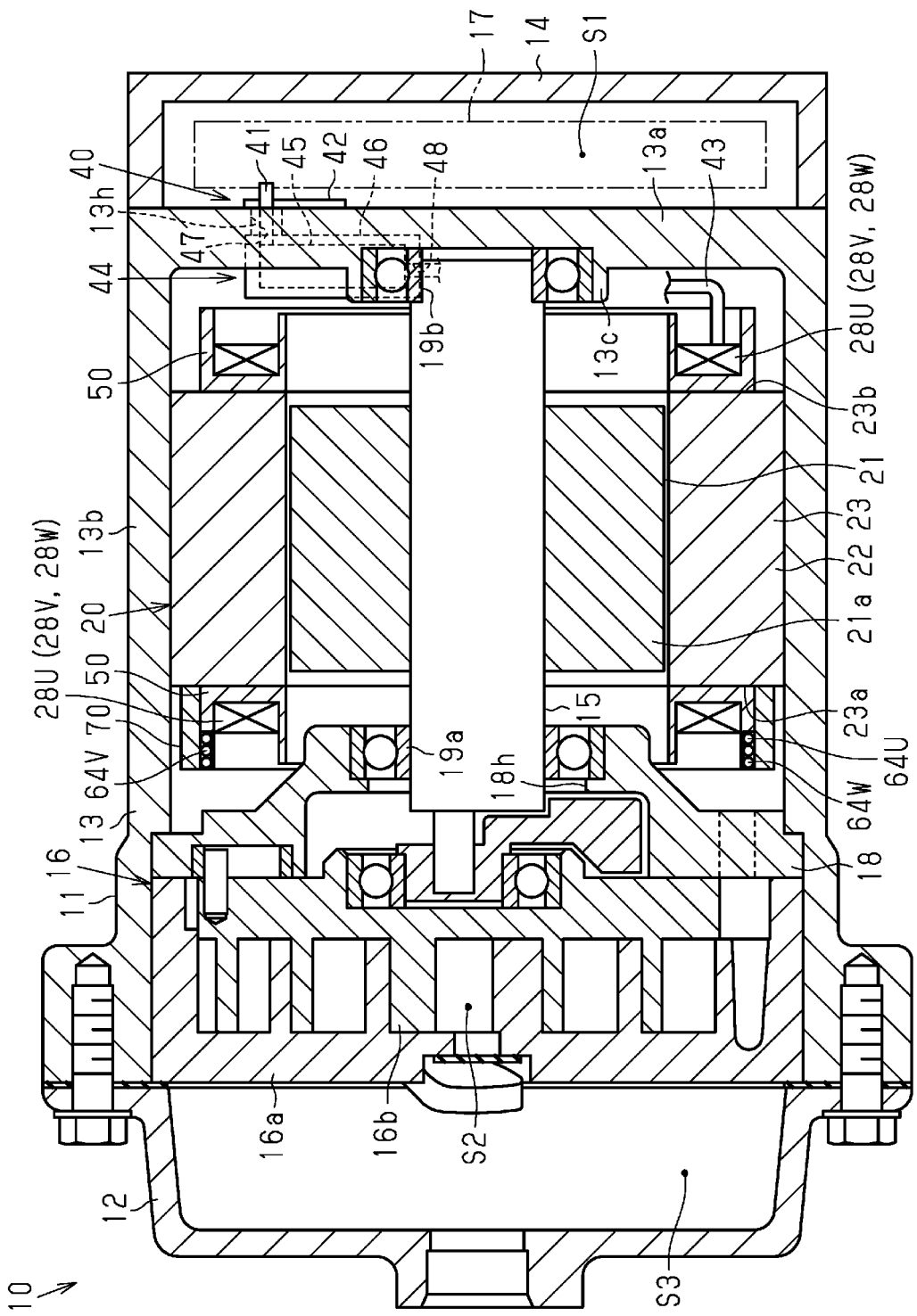
FIG. 1 is a cross-sectional view showing a motor-driven compressor according to an embodiment.

As shown in FIG. 1, the motor-driven compressor 10 includes a tubular housing 11. The housing 11 includes a discharge housing member 12, a motor housing member 13, and an inverter case 14. The discharge housing member 12, the motor housing member 13, and the inverter case 14 are made of metal. The discharge housing member 12, the motor housing member 13, and the inverter case 14 are made of, for example, aluminum.

The motor housing member 13 includes an end wall 13a and a peripheral wall 13b. The end wall 13a is plate-shaped. The peripheral wall 13b tubularly extends from the outer periphery of the end wall 13a. The discharge housing member 12 is tubular. The discharge housing member 12 is coupled to an end of the peripheral wall 13b of the motor housing member 13 on a side opposite to the end wall 13a. The inverter case 14 is tubular. The inverter case 14 is coupled to the end wall 13a of the motor housing member 13. The end wall 13a of the motor housing member 13 and the inverter case 14 define an inverter chamber S1.

The motor housing member 13 includes a boss 13c. The boss 13c is cylindrical. The boss 13c protrudes from an end face of the end wall 13a of the motor housing member 13 located at the center of the peripheral wall 13b. The axis of the boss 13c coincides with the axis of the peripheral wall 13b of the motor housing member 13. The end wall 13a of the motor housing member 13 includes a through-hole 13h. The through-hole 13h extends through the end wall 13a of the motor housing member 13 in the thickness direction. The through-hole 13h is located closer to the peripheral wall 13b than the boss 13c is.

The motor-driven compressor 10 includes a rotary shaft 15, a compression unit 16, an inverter 17, and a motor 20. The rotary shaft 15, the compression unit 16, and the motor 20 are accommodated in the motor housing member 13. Thus, the housing 11 accommodates the motor 20. The rotary shaft 15 is disposed in the motor housing member 13 with the axis of the rotary shaft 15 agreeing with the axis of the peripheral wall 13b of the motor housing member 13. The inverter 17 is accommodated in the inverter chamber S1.

The compression unit 16 and the motor 20 are disposed in the axial direction of the rotary shaft 15. The motor 20 is disposed to be closer to the end wall 13a of the motor housing member 13 than the compression unit 16 is. The compression unit 16, the motor 20, and the inverter 17 are disposed in that order in the axial direction of the rotary shaft 15.

The motor-driven compressor 10 includes a shaft supporting member 18. The shaft supporting member 18 is disposed between the compression unit 16 and the motor 20. The shaft supporting member 18 thus serves as a partition wall between the motor 20 and the compression unit 16.

The shaft supporting member 18 includes an insertion hole 18h. The insertion hole 18h is located at the center of the shaft supporting member 18. The axis of the insertion hole 18h agrees with the axis of the boss 13c. A first end of the rotary shaft 15 is inserted through the insertion hole 18h. A radial bearing 19a is provided between the insertion hole 18h and the first end of the rotary shaft 15. The first end of the rotary shaft 15 is rotationally supported by the shaft supporting member 18 with the radial bearing 19a. A second end of the rotary shaft 15 is inserted into the boss 13c. A radial bearing 19b is provided between the boss 13c and the second end of the rotary shaft 15. The second end of the rotary shaft 15 is rotationally supported by the boss 13c with the radial bearing 19b.

The compression unit 16 includes a fixed scroll 16a and an orbiting scroll 16b. The fixed scroll 16a is fixed to the motor housing member 13. The orbiting scroll 16b is disposed to be opposed to the fixed scroll 16a. The compression unit 16 is driven by rotation of the rotary shaft 15. The compression unit 16 compresses refrigerant, which is a fluid. Compression chambers S2, the volume of which is variable, are defined between the fixed scroll 16a and the orbiting scroll 16b. A discharge chamber S3 is defined between the fixed scroll 16a and the discharge housing member 12. Changes in the volumes of the compression chambers S2 compress the refrigerant, which is then discharged to the discharge chamber S3. The motor 20 rotates the rotary shaft 15 to drive the compression unit 16.

Basic Configuration of Motor

The motor 20 includes a rotor 21 and a stator 22. The stator 22 is tubular. The rotor 21 is disposed on the inner side of the stator 22. The rotor 21 includes a cylindrical rotor core 21a and permanent magnets (not shown) embedded in the rotor core 21a. The rotor core 21a is fixed to the rotary shaft 15. The rotor core 21a is configured to rotate integrally with the rotary shaft 15.

The stator 22 includes a tubular stator core 23. The stator core 23 is fixed to the inner circumferential surface of the peripheral wall 13b of the motor housing member 13. The stator core 23 is thus fixed to the housing 11. The stator 22 is coupled to the housing 11 by fitting the stator core 23 to the inner circumferential surface of the peripheral wall 13b of the motor housing member 13 through, for example, shrink-fitting.

The stator core 23 includes a first end face 23a and a second end face 23b. The first end face 23a is located on one side in the axial direction of the stator core 23. The second end face 23b is located on the other side in the axial direction of the stator core 23. The stator core 23 is disposed in the motor housing member 13 such that the first end face 23a faces the shaft supporting member 18 in the axial direction of the rotary shaft 15, and that the second end face 23b faces the end wall 13a of the motor housing member 13 in the axial direction of the rotary shaft 15.

Figure 2:
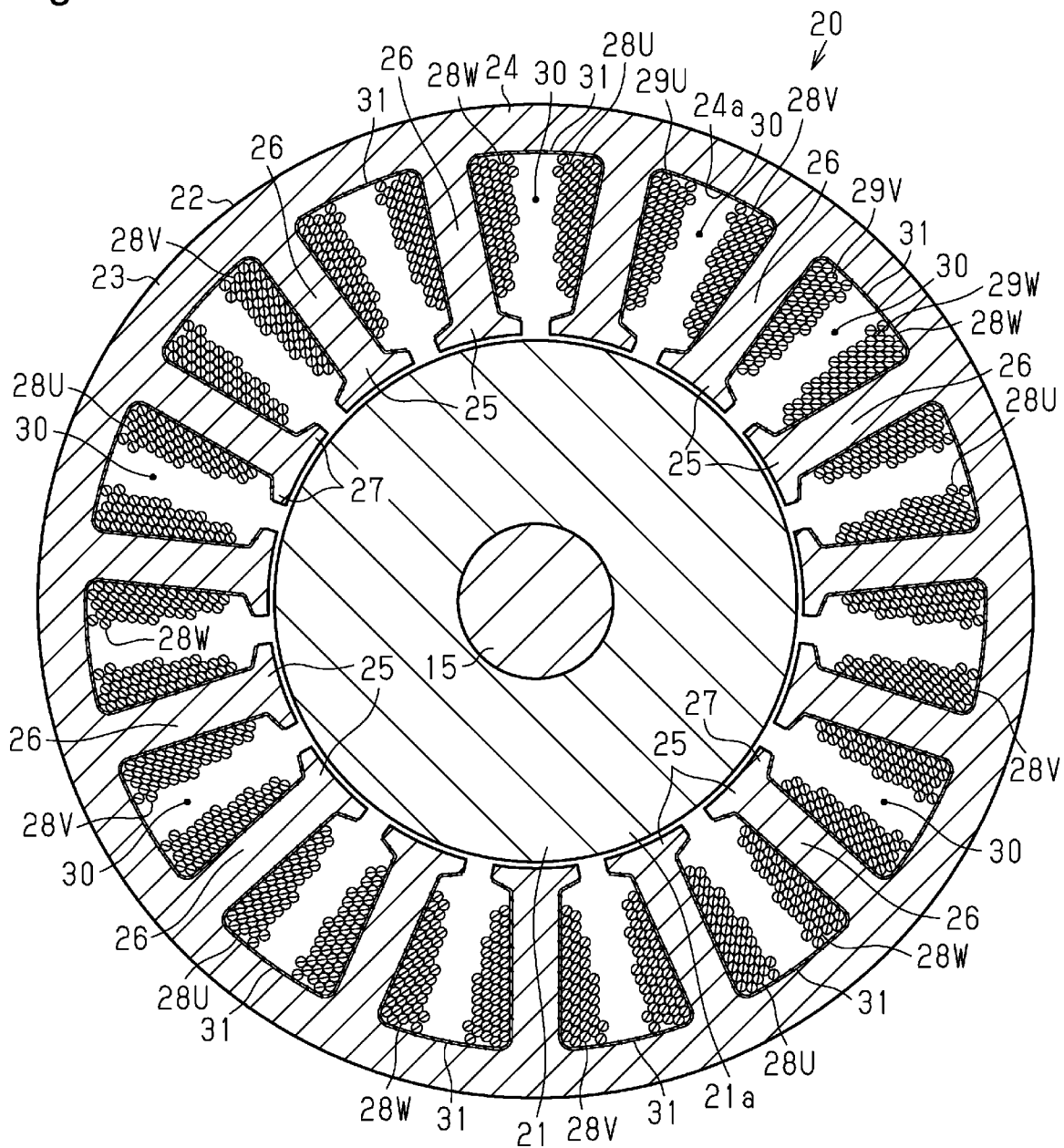
FIG. 2 is a cross-sectional view of a motor.
Figure 3:
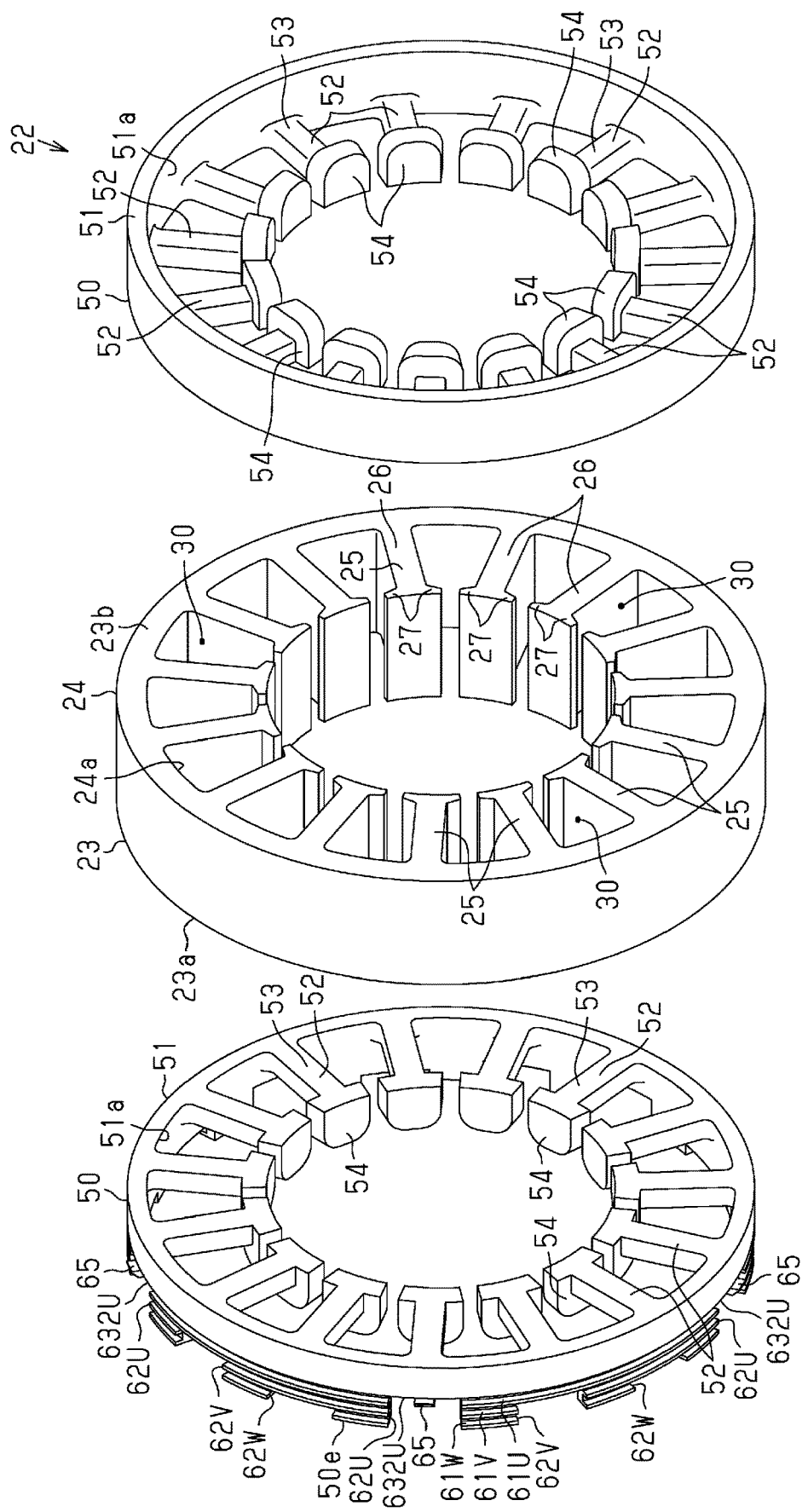
FIG. 3 is an exploded perspective view showing a stator core and two insulators.

As shown in FIGS. 2 and 3, the stator core 23 includes a yoke 24 and teeth 25. The yoke 24 is cylindrical. The stator core 23 is fixed to the motor housing member 13 by fitting the outer circumferential surface of the yoke 24 into the inner circumferential surface of the peripheral wall 13b of the motor housing member 13.

The teeth 25 extend from an inner circumferential surface 24a of the yoke 24 in a radial direction of the yoke 24. The teeth 25 are spaced apart from each other in the circumferential direction of the yoke 24. The teeth 25 are disposed at equal intervals in the circumferential direction of the yoke 24. The circumferential direction of the yoke 24 refers to the circumferential direction of the stator core 23. Each tooth 25 extends from the inner circumferential surface 24a of the yoke 24 toward the axis of the stator core 23. In the present embodiment, the stator core 23 includes fifteen teeth 25.

Each tooth 25 includes a tooth extension 26 and tooth flanges 27. The tooth extension 26 is a thin plate that extends from the inner circumferential surface 24a of the yoke 24. The tooth extension 26 extends from the first end face 23a to the second end face 23b of the stator core 23. The tooth flanges 27 project from the end of the tooth extension 26 on the side opposite to the yoke 24 toward the opposite sides in the circumferential direction of the stator core 23.

As shown in FIG. 2, the stator 22 includes coils, which are U-phase coils 28U, V-phase coils 28V, and W-phase coils 28W. The stator 22 thus includes multiple coils. The coils include the U-phase coils 28U, the V-phase coils 28V, and the W-phase coils 28W.

Windings

The stator 22 includes a U-phase winding 29U, which is wound on the stator core 23 using a concentrated winding configuration to form the U-phase coils 28U. The stator 22 includes a V-phase winding 29V, which is wound on the stator core 23 using a concentrated winding configuration to form the V-phase coils 28V. The stator 22 includes a W-phase winding 29W, which is wound on the stator core 23 using a concentrated winding configuration to form the W-phase coils 28W. The stator 22 thus includes windings that form multiple coils. The windings include the U-phase winding 29U, the V-phase winding 29V, and the W-phase winding 29W. Parts of each of the U-phase coils 28U, the V-phase coils 28V, and the W-phase coils 28W pass through a slot 30, which is a space between two of the teeth 25 that are adjacent to each other in the circumferential direction of the stator core 23. Parts of each of the U-phase coils 28U, the V-phase coils 28V, and the W-phase coils 28W passing through the corresponding slot 30 are insulated from the stator core 23 by a slot insulating sheet 31.

Hermetic Terminal

As shown in FIG. 1, the motor-driven compressor 10 includes a hermetic terminal 40. The hermetic terminal 40 includes three conductive members 41, which respectively correspond to the U-phase coils 28U, the V-phase coils 28V, and the W-phase coils 28W. FIG. 1 shows only one conductive member 41. Each conductive member 41 is a columnar metal terminal that extends linearly. Each conductive member 41 includes a first end that is electrically connected to the inverter 17 in the inverter chamber S1. Each conductive member 41 includes a second end that projects from the inverter chamber S1 into the motor housing member 13 through the through-hole 13h. The hermetic terminal 40 includes a support plate 42. The support plate 42 supports the three conductive members 41 while insulating the three conductive members 41 from each other. The support plate 42 is fixed to the outer surface of the end wall 13a of the motor housing member 13 around the through-hole 13h in the inverter chamber S1.

The motor-driven compressor 10 includes motor wires 43. The motor wires 43 are routed out of the motor 20. The motor wires 43 extend from sections of the U-phase coils 28U, the V-phase coils 28V, and the W-phase coils 28W that are located on the second end face 23b of the stator core 23. The motor wires 43 are routed out of the motor 20 for the respective phases. Thus, three motor wires 43 are routed out from the motor 20. FIG. 1 shows only one of the motor wires 43.

The motor housing member 13 accommodates a connector 44. The connector 44 is disposed between the second end face 23b of the stator core 23 and the end wall 13a of the motor housing member 13. The connector 44 includes three connection terminals 45, which correspond to the U-phase coils 28U, the V-phase coils 28V, and the W-phase coils 28W, and an insulating cluster block 46, which accommodates the three connection terminals 45.

The cluster block 46 includes three conductive member insertion holes 47 and three motor wire insertion holes 48. FIG. 1 shows only one conductive member insertion hole 47 and only one motor wire insertion hole 48. The conductive members 41 are respectively inserted into the conductive member insertion holes 47. The motor wires 43 are respectively inserted into the motor wire insertion holes 48. Each connection terminal 45 electrically connects the corresponding conductive member 41 to the corresponding motor wire 43. The cluster block 46 is disposed in the motor housing member 13 such that the conductive member insertion holes 47 extend in the axial direction of the rotary shaft 15.

The power from the inverter 17 is supplied to the motor 20 via the conductive members 41, the connection terminals 45, and the motor wires 43. This drives the motor 20. The inverter 17 thus drives the motor 20. When the motor 20 is driven, the compression unit 16 is driven to compress the refrigerant.

Insulators

As shown in FIG. 1, the stator 22 includes two insulators 50. Each insulator 50 is tubular. Each insulator 50 is made of, for example, plastic. Each insulator 50 insulates the U-phase coils 28U, the V-phase coils 28V, and the W-phase coils 28W from the stator core 23.

As shown in FIG. 3, each insulator 50 includes an insulator base 51 and insulator tooth portions 52. The insulator base 51 is cylindrical. The insulators 50 are disposed on the stator core 23 with the axes of the insulator bases 51 agreeing with the axis of the yoke 24. One of the two insulators 50 is disposed on the stator core 23 with the insulator base 51 in contact with the first end face 23a of the stator core 23. The other one of the two insulators 50 is disposed on the stator core 23 with the insulator base 51 in contact with the second end face 23b of the stator core 23. Each insulator 50 is thus in contact with an end face of the stator core 23. The outer diameter of the insulator base 51 is smaller than the outer diameter of the yoke 24. The inner diameter of the insulator base 51 is equal to the inner diameter of the yoke 24.

Each insulator tooth portion 52 extends in the radial direction of the insulator base 51 from an inner circumferential surface 51a of the insulator base 51. The insulator tooth portions 52 are spaced apart from each other in the circumferential direction of the insulator base 51. The insulator tooth portions 52 are disposed at equal intervals in the circumferential direction of the insulator base 51. Each insulator tooth portion 52 extends from the inner circumferential surface 51a of the insulator base 51 toward the axis of the insulator base 51. In the present embodiment, each insulator 50 includes fifteen insulator tooth portions 52. The number of the insulator tooth portions 52 is the same as the number of the teeth 25 of the stator core 23.

Each insulator tooth portion 52 includes an insulator extension 53 and insulator flanges 54. Each insulator extension 53 has the shape of a post that extends from the inner circumferential surface 51a of the insulator base 51. The width of each insulator extension 53 in the circumferential direction of the insulator base 51 is equal to the width of each tooth extension 26 in the circumferential direction of the stator core 23. Each insulator extension 53 is in contact with the corresponding tooth 25. The insulator flanges 54 project along the insulator base 51 from the end of the insulator extension 53 on the side opposite to the insulator base 51.

Guide Grooves

One of the two insulators 50 that is in contact with the first end face 23a of the stator core 23 includes U-phase guide grooves 61U, V-phase guide grooves 61V, and W-phase guide grooves 61W. The U-phase guide grooves 61U, the V-phase guide grooves 61V, and the W-phase guide grooves 61W are disposed side by side in the axial direction of the insulator 50. The U-phase guide grooves 61U, the V-phase guide grooves 61V, and the W-phase guide grooves 61W are formed in the outer circumferential surface of the insulator base 51. The U-phase guide grooves 61U, the V-phase guide grooves 61V, and the W-phase guide grooves 61W are thus formed in the outer circumferential surface of the insulator 50. The U-phase guide grooves 61U, the V-phase guide grooves 61V, and the W-phase guide grooves 61W extend in the circumferential direction of the insulator 50. The U-phase guide groove 61U, the V-phase guide groove 61V, and the W-phase guide groove 61W do not extend through the insulator base 51.

The U-phase guide grooves 61U are farther from an end face 50e of the insulator 50 on the side opposite to the stator core 23 in the axial direction of the insulator 50 than the V-phase guide grooves 61V and the W-phase guide grooves 61W are. The V-phase guide grooves 61V are farther from the end face 50e of the insulator 50 on the side opposite to the stator core 23 in the axial direction of the insulator 50 than the W-phase guide grooves 61W are. Thus, among the U-phase guide grooves 61U, the V-phase guide grooves 61V, and the W-phase guide grooves 61W, the U-phase guide grooves 61U are farthest from the end face 50e of the insulator 50 on the side opposite to the stator core 23 in the axial direction of the insulator 50.

Through-Grooves

Figure 4:
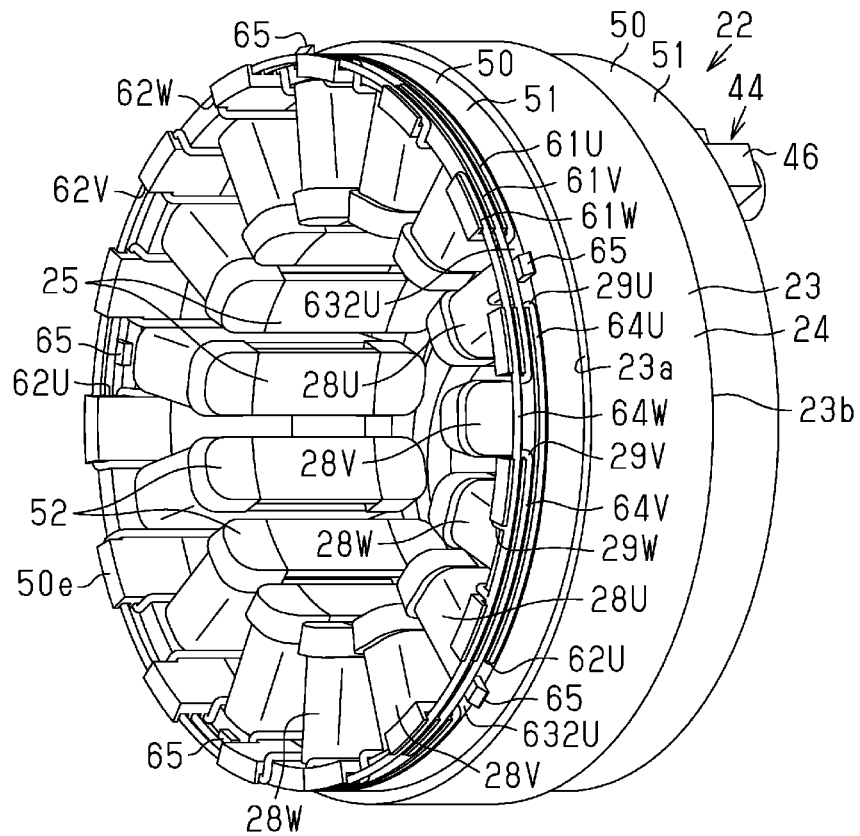
FIG. 4 is a perspective view of a stator.

As shown in FIGS. 3 and 4, one of the two insulators 50 that is in contact with the first end face 23a of the stator core 23 includes five U-phase through-grooves 62U, five V-phase through-grooves 62V, and five W-phase through-grooves 62W. The U-phase through-grooves 62U, the V-phase through-grooves 62V, and the W-phase through-grooves 62W extend through the insulator 50 in the radial direction.

Figure 5:
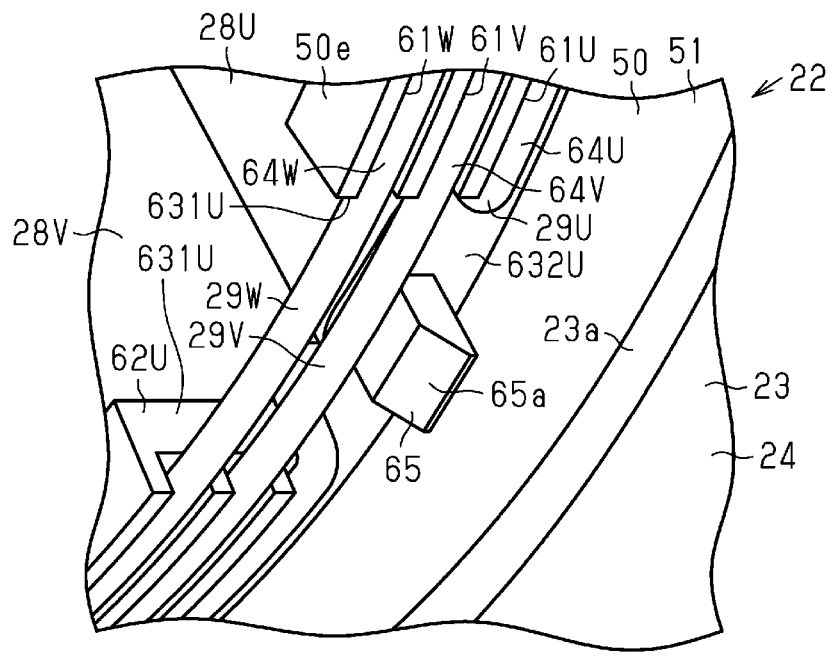
FIG. 5 is an enlarged perspective view showing an engaging portion.

As shown in FIG. 5, each U-phase through-groove 62U opens in the end face 50e of the insulator 50, which is on the side opposite to the stator core 23, so as to have two side surfaces 631U and a bottom surface 632U. The two side surfaces 631U face each other in the circumferential direction of the insulator 50. The bottom surface 632U connects the two side surfaces 631U, which face each other. The bottom surface 632U of each U-phase through-groove 62U is flush with and continuous with the corresponding U-phase guide grooves 61U.

Although not illustrated in an enlarged view as in FIG. 5, the V-phase through-grooves 62V and the W-phase through-grooves 62W each include two side surfaces and a bottom surface in the same manner as the U-phase through-grooves 62U. The bottom surface of each V-phase through-groove 62V is flush with and continuous with the corresponding V-phase guide grooves 61V. The bottom surface of each W-phase through-groove 62W is flush with and continuous with the corresponding W-phase guide grooves 61W. Thus, among the U-phase through-grooves 62U, the V-phase through grooves 62V, and the W-phase through-grooves 62W, the U-phase through-grooves 62U are through-grooves that have the longest distance from the opening of the insulator 50 on the side opposite to the stator core 23 to the bottom surfaces 632U.

Coils

As shown in FIG. 4, the U-phase coils 28U, the V-phase coils 28V, and the W-phase coils 28W are each formed using a series winding configuration. In a series winding configuration, first, the U-phase winding 29U, the V-phase winding 29V, and the W-phase winding 29W are wound around respective sets of the tooth extensions 26 and the insulator extensions 53 of the insulators 50. The U-phase winding 29U, the V-phase winding 29V, and the W-phase winding 29W are each wound, using a concentrated winding configuration, around every third set of a tooth extension 26 and insulator extensions 53 of the insulators 50 in the circumferential direction of the stator core 23. Therefore, the U-phase coils 28U, the V-phase coils 28V, and the W-phase coils 28W are disposed at every third position in the circumferential direction of the stator core 23. In the present embodiment, five U-phase coils 28U, five V-phase coils 28V, and five W-phase coils 28W are provided. The U-phase coils 28U, the V-phase coils 28V, and the W-phase coils 28W are disposed in the respective slots 30 such that coils of different phases are adjacent to each other in the circumferential direction of the stator core 23.

Connecting Wires

The U-phase winding 29U includes U-phase connecting wires 64U, which connect the U-phase coils 28U in the circumferential direction of the stator core 23. Each U-phase connecting wire 64U is routed out from a part of a U-phase coil 28U that is closer to the first end face 23a of the stator core 23 and is guided to the corresponding U-phase guide groove 61U via the corresponding U-phase through-groove 62U. Thus, the U-phase guide grooves 61U guide the U-phase connecting wires 64U in the circumferential direction of the insulator 50. The U-phase through-grooves 62U guide the U-phase connecting wires 64U routed out of the U-phase coils 28U to the U-phase guide grooves 61U.

The V-phase winding 29V includes V-phase connecting wires 64V, which connect the V-phase coils 28V in the circumferential direction of the stator core 23. Each V-phase connecting wire 64V is routed out from a part of a V-phase coil 28V that is closer to the first end face 23a of the stator core 23 and is guided to the corresponding V-phase guide groove 61V via the corresponding V-phase through-groove 62V. Thus, the V-phase guide grooves 61V guide the V-phase connecting wires 64V in the circumferential direction of the insulator 50. The V-phase through-grooves 62V guide the V-phase connecting wires 64V routed out of the V-phase coils 28V to the V-phase guide grooves 61V.

The W-phase winding 29W includes W-phase connecting wires 64W, which connect the W-phase coils 28W in the circumferential direction of the stator core 23. Each W-phase connecting wire 64W is routed out from a part of a W-phase coil 28W that is closer to the first end face 23a of the stator core 23 and is guided to the corresponding W-phase guide groove 61W via the corresponding W-phase through-groove 62W. Thus, the W-phase guide grooves 61W guide the W-phase connecting wires 64W in the circumferential direction of the insulator 50. The W-phase through-grooves 62W guide the W-phase connecting wires 64W routed out of the W-phase coils 28W to the W-phase guide grooves 61W.

As described above, the windings each include connecting wires that connect the coils in the circumferential direction of the stator core 23. The connecting wires include the U-phase connecting wires 64U, the V-phase connecting wires 64V, and the W-phase connecting wires 64W. One of the insulators 50 includes guide grooves that guide the connecting wires in the circumferential direction of the insulator 50. The guide grooves include the U-phase guide grooves 61U, the V-phase guide grooves 61V, and the W-phase guide grooves 61W. The insulator 50 includes through-grooves that guide connecting wires routed out from coils to the guide grooves. The through-grooves include the U-phase through-grooves 62U, the V-phase through-grooves 62V, and the W-phase through-grooves 62W.

The U-phase connecting wires 64U, the V-phase connecting wires 64V, and the W-phase connecting wires 64W are located on the opposite side of the stator core 23 from the motor wires 43. The U-phase guide grooves 61U, V-phase guide grooves 61V, and W-phase guide grooves 61W guide the U-phase connecting wires 64U, the V-phase connecting wires 64V, and the W-phase connecting wires 64W in the circumferential direction of the insulator 50 on the opposite side of the stator core 23 from the motor wires 43.

Engaging Portions

As shown in FIG. 5, one of the two insulators 50 that is in contact with the first end face 23a of the stator core 23 includes projections 65, which serve as engaging portions. Each projection 65 is provided on the bottom surface 632U of one of the U-phase through-grooves 62U. Thus, among the U-phase through-grooves 62U, the V-phase through-grooves 62V, and the W-phase through-grooves 62W, the projections 65 are provided on the bottom surfaces of the through-grooves that have the longest distance from openings of the insulator 50 on the side opposite to the stator core 23 to the bottom surfaces. In this manner, each projection 65 is provided on the bottom surface of one of the through-grooves.

Each projection 65 projects from the bottom surface 632U of the corresponding U-phase through-groove 62U. Thus, in the present embodiment, the engaging portions are projections 65 that project from the bottom surfaces 632U of the U-phase through-grooves 62U. The projections 65 project outward in the radial direction of the insulator 50 from the bottom surfaces 632U of the U-phase through-grooves 62U. The projections 65 project outward in the radial direction of the insulator 50 from the outer circumferential surface of the insulator base 51. Each projection 65 has a shape of a quadrangular prism. Each projection 65 has a tapered surface 65a at the distal end on the side opposite to the stator core 23. The tapered surface 65a is inclined toward the stator core 23 as the tapered surface 65a extends toward the distal end of the projection 65.

Cover

Figure 6:
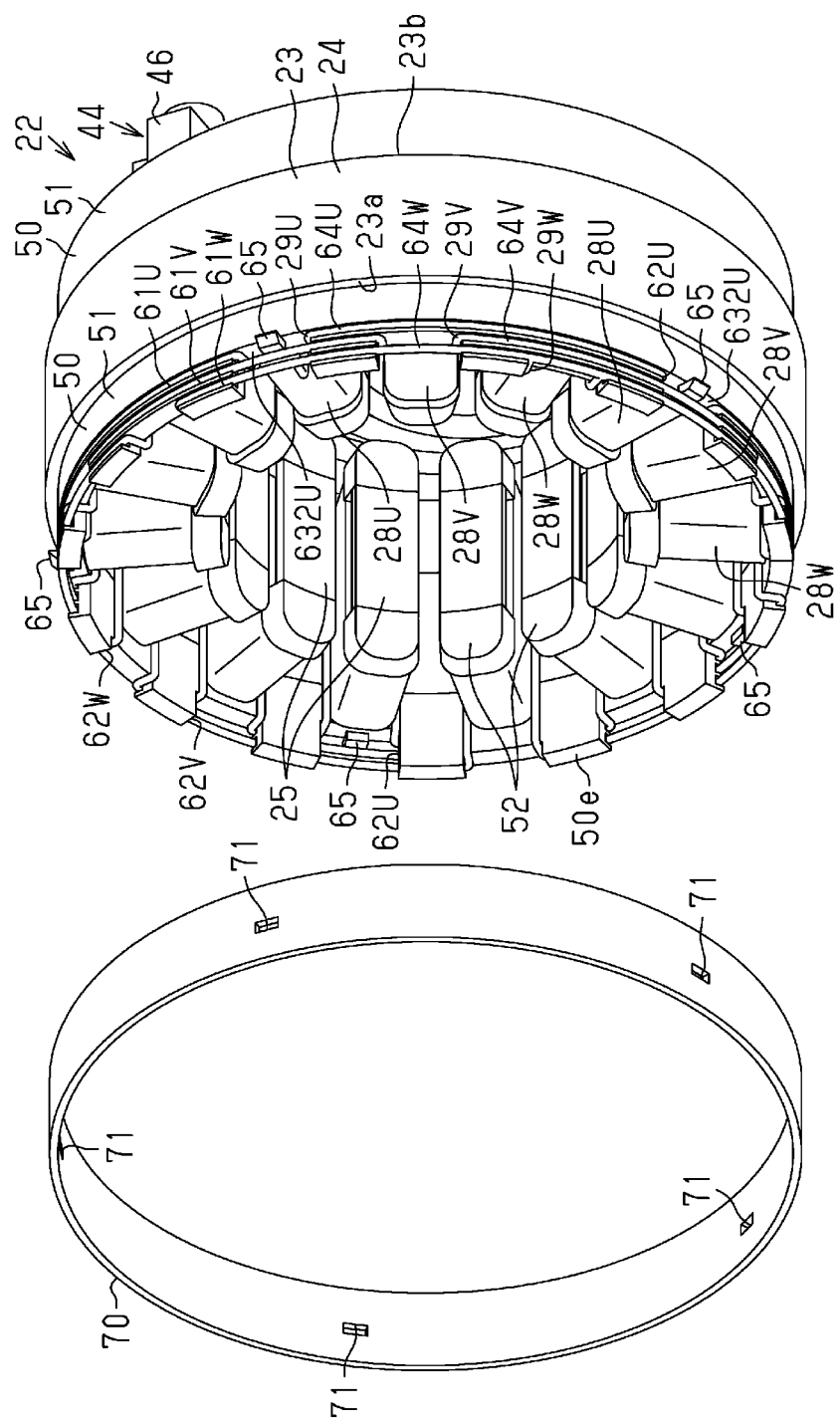
FIG. 6 is an exploded perspective view of the stator, showing a state before a cover is attached to an insulator.
Figure 7:
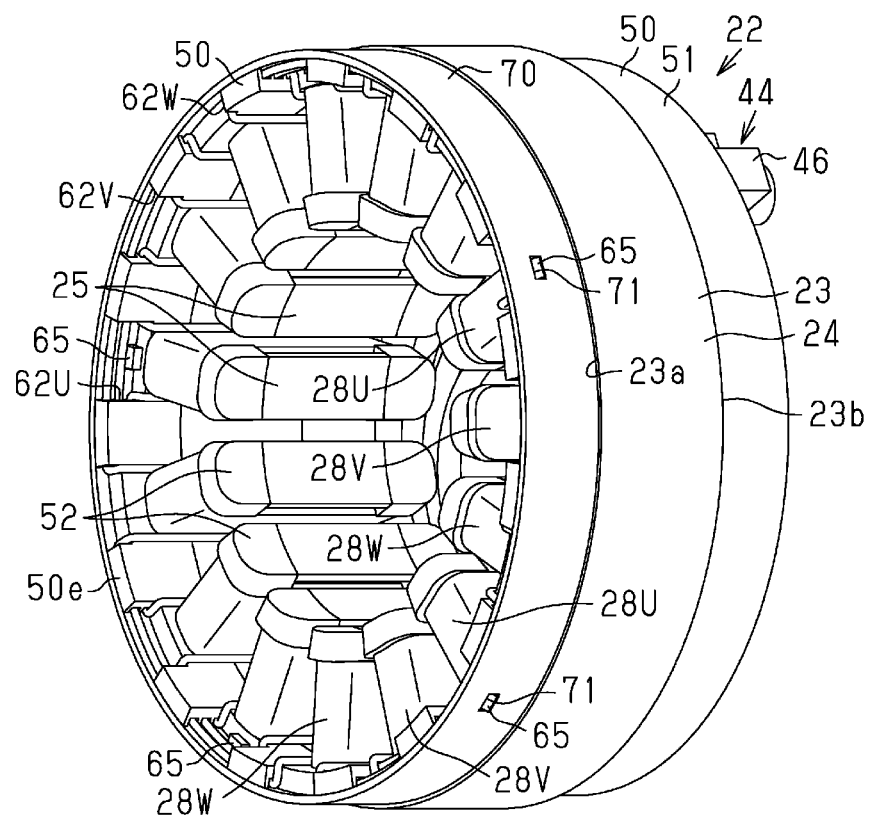
FIG. 7 is a perspective view of the stator, showing a state in which the cover is attached to an insulator.

As shown in FIGS. 6 and 7, the motor-driven compressor 10 includes a cover 70. The cover 70 is cylindrical. The cover 70 has an insulating property. The cover 70 is made of, for example, plastic. The inner diameter of the cover 70 is larger than the outer diameter of the corresponding insulator base 51. As shown in FIG. 1, the cover 70 surrounds the outer circumferential surface of one of the two insulators 50 that is in contact with the first end face 23a of the stator core 23. Thus, the cover 70 is disposed between the peripheral wall 13b of the motor housing member 13 and the set of the U-phase connecting wires 64U, the V-phase connecting wires 64V, and the W-phase connecting wires 64W. The cover 70 ensures insulation between the motor housing member 13 and the set of the U-phase connecting wires 64U, the V-phase connecting wires 64V, and the W-phase connecting wires 64W.

Receiving Portions

As shown in FIGS. 6 and 7, the cover 70 includes insertion portions 71, which serve as receiving portions. The insertion portions 71 are holes extending through the cover 70. Each projection 65 can be inserted into one of the insertion portions 71. Thus, in the present embodiment, the receiving portions are the insertion portion 71, which are formed in the cover 70 and configured to receive the projections 65. The insertion portions 71 are disposed at positions in the cover 70 that correspond to the respective projections 65.

Figure 8:
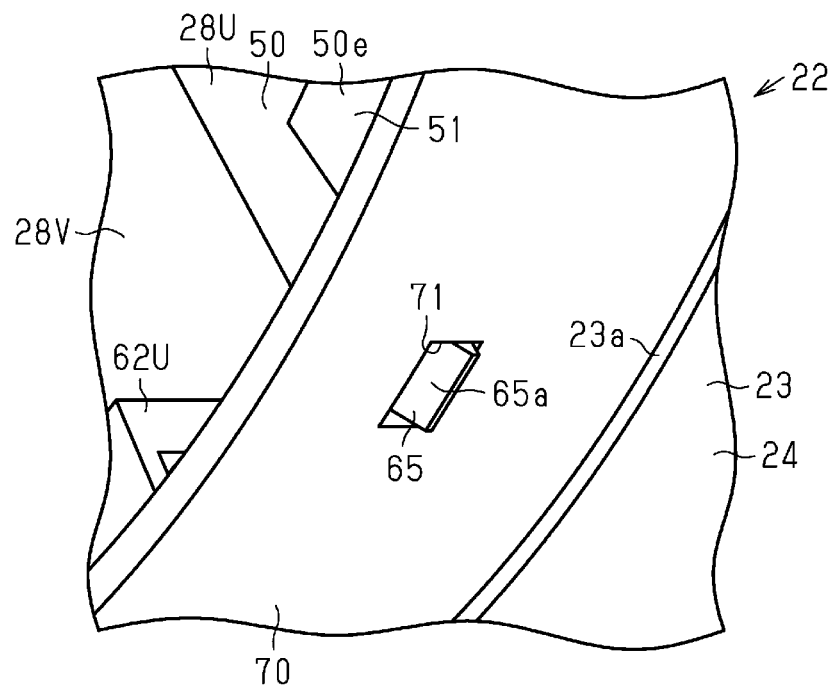
FIG. 8 is an enlarged perspective view showing the relationship between an engaging portion and a receiving portion.

As shown in FIG. 8, the insertion portion 71 is a rectangular hole. By inserting the projection 65 into the insertion portion 71, the projection 65 is engaged with the insertion portion 71. Therefore, the projection 65 is engaged with the insertion portion 71. By engaging each projection 65 with the corresponding insertion portion 71, the cover 70 is attached to the insulator 50. The contact between the projections 65 and the insertion portions 71 restricts movement of the cover 70 relative to the insulator 50 in the axial direction of the insulator 50 and movement of the cover 70 relative to the insulator 50 in the circumferential direction of the insulator 50.

When the cover 70 is attached to the insulator 50, the inner edge of the cover 70 first contacts the tapered surfaces 65a of the projections 65. Then, the cover 70 is forced into the insulator 50 toward the first end face 23a of the stator core 23. At this time, the tapered surfaces 65a of the projections 65 reduce the impact of contact between the inner edge of the cover 70 and the distal ends of the projections 65. By inserting each projection 65 into the corresponding insertion portion 71, the cover 70 is attached to the insulator 50.

Operation of Embodiment

Operation of the present embodiment will now be described.

Tension of the U-phase connecting wires 64U, the V-phase connecting wires 64V, and the W-phase connecting wires 64W is applied to each insulator 50. Accordingly, the insulator 50 is deformed such that the insulator 50 is bent inward in the radial direction about the end of the insulator 50 closer to the stator core 23. Thus, the displacement amount of the insulator 50 toward the radially inner side is the largest at the end of the insulator 50 on the side opposite to the stator core 23.

The displacement amount of the insulator 50 toward the radially inner side is smaller at the bottom surfaces 632U of the U-phase through-grooves 62U than at the at the end of the insulator 50 on the side opposite to the stator core 23. The displacement amount is the smallest at the bottom surfaces 632U of the U-phase through-grooves 62U, which have the longest distance from the opening of the insulator 50 on the side opposite to the stator core 23 to the bottom surfaces, among the U-phase through-grooves 62U, the V-phase through-grooves 62V, and the W-phase through-grooves 62W.

The projections 65 are thus provided on the bottom surfaces 632U of the U-phase through-grooves 62U. This configuration ensures a sufficient engagement amount of each projection 65 with the corresponding insertion portion 71 as compared to a case in which the projections 65 are provided on the end of the insulator 50 on the side opposite to the stator core 23. As a result, each projection 65 is stably engaged with the corresponding insertion portion 71. This allows the cover 70 to be stably attached to the insulator 50.

Advantages of Embodiment

The above-described embodiment has the following advantages.

(1) The projections 65 are provided on the bottom surfaces 632U of the U-phase through-grooves 62U. This configuration ensures a sufficient engagement amount of each projection 65 with the corresponding insertion portion 71 as compared to a case in which the projections 65 are provided on the end of the insulator 50 on the side opposite to the stator core 23. As a result, each projection 65 is stably engaged with the corresponding insertion portion 71. This allows the cover 70 to be stably attached to the insulator 50. This improves the reliability of the motor-driven compressor 10.

(2) The projections 65 are provided on the bottom surfaces 632U of the U-phase through-grooves 62U, which have the longest distance from the opening of the insulator 50 on the side opposite to the stator core 23 to the bottom surface 632U, among the U-phase through-grooves 62U, the V-phase through-grooves 62V, and the W-phase through-grooves 62W. This configuration reliably ensures a sufficient engagement amount of each projection 65 with the corresponding insertion portion 71. Since this allows each projection 65 to be stably engaged with the corresponding insertion portion 71, the cover 70 is stably attached to the insulator 50. This further improves the reliability of the motor-driven compressor 10.

(3) The configuration of the engaging portions, which are the projections 65 projecting from the bottom surfaces 632U of the U-phase through-grooves 62U, facilitates the manufacture of the insulator 50. This facilitates the manufacture of the motor-driven compressor 10.

(4) Each projection 65 is provided on the bottom surface 632U of the corresponding U-phase through-groove 62U. This readily ensures the insulation distance between the U-phase connecting wires 64U and the housing 11 with the insertion portions 71 in between, as compared to, for example, a case in which the projection 65 are provided on the walls defining the U-phase guide grooves 61U, to which the U-phase connecting wires 64U are guided.

(5) Each projection 65 is provided on the bottom surface 632U of the corresponding U-phase through-groove 62U. Thus, there is no need to provide the projections 65 at, for example, portions of the insulator base 51 between the U-phase guide grooves 61U and the stator core 23. Since there is no need to provide spaces for the projections 65 at portions of the insulator base 51 between the U-phase guide grooves 61U and the stator core 23, it is possible to reduce the size of the insulator 50. This reduces the size of the motor-driven compressor 10.

Modifications

The above-described embodiment may be modified as follows. The above-described embodiment and the following modifications can be combined if the combined modifications remain technically consistent with each other.

Figure 9:
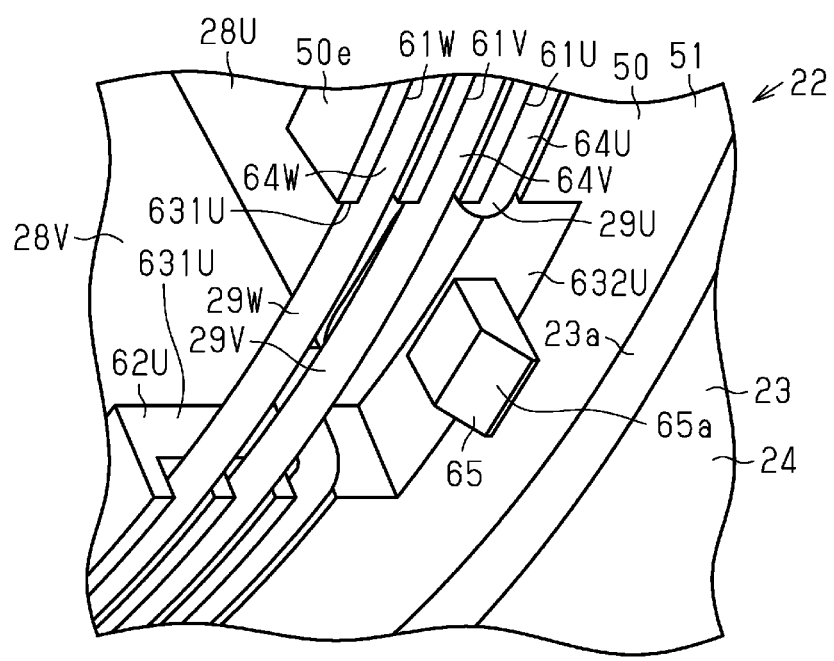
FIG. 9 is an enlarged perspective view showing an engaging portion according to another embodiment.

For example, a structure shown in FIG. 9 may be employed in which the bottom surface 632U of each U-phase through-groove 62U is neither flush with nor continuous with the corresponding U-phase guide grooves 61U, and a step is formed between the bottom surface 632U of the U-phase through-groove 62U and each U-phase guide groove 61U. The bottom surface 632U of the U-phase through-groove 62U is continuous with the U-phase guide grooves 61U via parts of the two side surfaces 631U. The bottom surface 632U of the U-phase through-groove 62U is located closer to the stator core 23 than the U-phase guide grooves 61U are.

In the embodiment shown in FIG. 9, the projection 65 may be provided on the insulator 50 such that the projection 65 is in contact with a part of one of the side surfaces 631U and the bottom surface 632U.

In the above-described embodiment, for example, the projections 65 may be provided on the bottom surfaces of the V-phase through-grooves 62V or on the bottom surfaces of the W-phase through-grooves 62W. In this case, the positions of the insertion portions 71 in the cover 70 need to be changed in correspondence with the positions of the projections 65.

In the above-described embodiment, the insertion portions 71 may be recesses that do not extend through the cover 70. That is, the insertion portions 71 may be modified as long as the insertion portions 71 are receiving portions that are formed in the cover 70, and the projections 65 are engaged with those receiving portions by being inserted.

In the above-described embodiment, for example, the bottom surface 632U of each U-phase through-groove 62U may include a hole serving as an engaging portion, and the cover 70 may include projections inserted into those holes. In short, the recess-projection relationship between the engaging portions and the receiving portions may be reversed.

In the above-described embodiment, the order in which the U-phase guide grooves 61U, V-phase guide grooves 61V, and W-phase guide grooves 61W are arranged in the axial direction of the insulator 50 may be changed.

In the above-described embodiment, the surface of the distal end of each projection 65 on the side opposite to the stator core 23 does not necessarily need to be the tapered surface 65a.

In the above-described embodiment, one of the two insulators 50 that is in contact with the second end face 23b of the stator core 23 may include the U-phase guide grooves 61U, the V-phase guide grooves 61V, and the W-phase guide grooves 61W. In this case, one of the two insulators 50 that is in contact with the second end face 23b of the stator core 23 includes the U-phase through-grooves 62U, the V-phase through-grooves 62V, and the W-phase through-grooves 62W. The U-phase connecting wires 64U, the V-phase connecting wires 64V, and the W-phase connecting wires 64W are located on the side of the stator core 23 closer to the motor wires 43. As described above, the U-phase guide grooves 61U, the V-phase guide grooves 61V, and the W-phase guide grooves 61W may guide the U-phase connecting wires 64U, the V-phase connecting wires 64V, and the W-phase connecting wires 64W in the circumferential direction of the insulator 50 on the side of the stator core 23 closer to the motor wires 43. In this case, the cover 70 surrounds the outer circumferential surface of one of the two insulators 50 that is in contact with the second end face 23b of the stator core 23. Thus, the cover 70 is disposed between the peripheral wall 13b of the motor housing member 13 and the set of the U-phase connecting wires 64U, the V-phase connecting wires 64V, and the W-phase connecting wires 64W.

In the above-described embodiment, the compression unit 16 is not limited to a scroll type, but may be, for example, a piston type or a vane type.

In the above-described embodiment, the motor-driven compressor 10 is used in the vehicle air conditioner. However, the present disclosure is not limited to this. For example, the motor-driven compressor 10 may be mounted on a fuel cell electric vehicle and use the compression unit 16 to compress air that is a fluid supplied to the fuel cell.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A motor-driven compressor, comprising:
a compression unit that compresses a fluid;
a motor that drives the compression unit; and
a tubular housing that accommodates the motor, wherein
the motor includes a stator,
the stator includes:
  a tubular stator core fixed to the housing;
  a tubular insulator that is in contact with an end face of the stator core; and
  windings that are wound on the stator core using a concentrated winding configuration to form coils,
the windings include connecting wires that connect the coils in a circumferential direction of the stator core,
the insulator includes:
  guide grooves that are formed in an outer circumferential surface of the insulator and extend in a circumferential direction of the insulator to guide the connecting wires in the circumferential direction of the insulator; and
  through-grooves that extend through the insulator in a radial direction and open in an end face of the insulator on a side opposite to the stator core such that each of the through-grooves has two side surfaces that face each other in the circumferential direction of the insulator and a bottom surface that connects the side surfaces to each other, the through-grooves guiding the connecting wires routed out from the coils to the guide grooves,
the motor-driven compressor comprises an insulating tubular cover that surrounds the outer circumferential surface of the insulator to be located between the connecting wires and the housing,
the insulator includes engaging portions,
the cover includes receiving portions with which the engaging portions are engaged,
the cover is attached to the insulator by engaging the engaging portions with the receiving portions, and
the engaging portions are respectively provided on the bottom surfaces.

2. The motor-driven compressor according to claim 1, wherein
the coils include U-phase coils, V-phase coils, and W-phase coils,
the windings include U-phase winding that forms the U-phase coils, V-phase winding that forms the V-phase coils, and W-phase winding that forms the W-phase coils,
the connecting wires include U-phase connecting wires that connect the U-phase coils in the circumferential direction of the stator core, V-phase connecting wires that connect the V-phase coils in the circumferential direction of the stator core, and W-phase connecting wires that connect the W-phase coils in the circumferential direction of the stator core,
the guide grooves include U-phase guide grooves that guide the U-phase connecting wires in the circumferential direction of the insulator, V-phase guide grooves that guide the V-phase connecting wires in the circumferential direction of the insulator, and W-phase guide grooves that guide the W-phase connecting wires in the circumferential direction of the insulator,
the U-phase guide grooves, the V-phase guide grooves, and the W-phase guide grooves are disposed side by side in an axial direction of the insulator,
the through-grooves include U-phase through-grooves that guide the U-phase connecting wires routed from the U-phase coils to the U-phase guide grooves, V-phase through-grooves that guide the V-phase connecting wires routed from the V-phase coils to the V-phase guide grooves, and W-phase through-grooves that guide the W-phase connecting wires routed out from the W-phase coils to the W-phase guide groove, and
among the U-phase through-grooves, the V-phase through-grooves, and the W-phase through-grooves, the engaging portions are provided on the bottom surfaces of the through-grooves that have the longest distance from openings of the insulator on the side opposite to the stator core to the bottom surfaces.

3. The motor-driven compressor according to claim 2, wherein
the engaging portion is a projection that projects from the bottom surface, and
the receiving portion is an insertion portion that is formed in the cover and configured to receive the projection.

4. The motor-driven compressor according to claim 1, wherein
the engaging portions are projections that project from the bottom surfaces, and
the receiving portions are formed in the cover, the projections being inserted into the receiving portions.

* * * * *